United States Statutory Invention Registration [19]

[11] Reg. Number: H607

Pryluck [43] Published: Mar. 7, 1989

[54] ADDRESSABLE DELAY MEMORY

[75] Inventor: Joseph A. Pryluck, San Jose, Calif.

[73] Assignee: The United States of America as represented by the Secretary of the Navy, Washington, D.C.

[21] Appl. No.: 885,481

[22] Filed: Jun. 27, 1986

[51] Int. Cl.[4] ..... G06F 1/00
[52] U.S. Cl. ..... 364/900
[58] Field of Search ... 364/200 MS File, 900 MS File

[56] References Cited

U.S. PATENT DOCUMENTS

| | | | |
|---|---|---|---|
| 4,080,652 | 3/1978 | Cronshaw et al. | 364/200 |
| 4,249,247 | 2/1981 | Patel | 364/900 |
| 4,414,664 | 11/1983 | Greenwood | 371/20 |
| 4,451,918 | 5/1984 | Gillette | 371/27 |

*Primary Examiner*—Stephen C. Buczinski
*Assistant Examiner*—Linda J. Wallace
*Attorney, Agent, or Firm*—C. D. B. Curry; W. C. Daubenspeck

[57] ABSTRACT

An addressable delay memory device which operates as a dual mode device. In the first mode, the addressable delay memory functions as a first in-first out delay memory in which the data is delayed for a predetermined period. In the second mode, the addressable delay memory operates under the control of a remote controller and delays input data for three predetermined periods. The input data is sequentially stored in each of three sections of a dynamic random access memory means with the three delays being determined by the time required to fill each of the three sections. The delayed data from each of the three sections is coupled to a static random access memory means. The remote controller may request that the data words from any of the three groups of delayed data be placed on the output of the addressable delay memory device.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADDRESSABLE DELAY MEMORY

BACKGROUND OF THE INVENTION

This invention relates in general to delay memory devices and, in particular, to an addressable digital delay memory device for use in an addressable encoder system. The invention relates especially to an addressable delay memory device in which data words may be delayed for varying periods and specified data words may be presented at the device output on the command of a master controller.

In aerospace testing and communications, one function of a digital telemetry system is to provide delayed transmission of some or all of the data in order to provide redundant radio links and to collect data from periods during which radio reception is impossible. This is accomplished by storing the data in a semiconductor memory and sending the data out some time later. In the typical system, the delay memory receives the data, stores the data for a defined period of time and then presents the data at an output for transmission to an external receiver on a first in - first out basis.

Although the first in-first out delay memory devices are satisfactory for many applications, increasingly complex aerospace systems and increasing data monitoring requirements have created a need for more flexibility in the delay memory device. It is now desirable to employ a delay memory in which the data words may be delayed for varying periods of time and specific data words selected for output as required by an external master controller.

SUMMARY OF THE INVENTION

It is therefore an object of the present invention to provide a digital delay memory which can function as an addressable delay memory unit in an addressable encoder system.

Another object is to provide a delay memory device for delaying data for a specified time on a first in - first out basis.

Another object is to provide a delay memory device for delaying data for three predetermined periods.

Another object is to provide a delay memory device for delaying data for three predetermined periods wherein the data delayed by each of the predetermined periods may be selected for output by a remote controller.

Briefly, the present invention provides an addressable delay memory device which operates as a dual mode device. In the first mode, the addressable delay memory functions as a first in - first out delay memory in which the data is delayed for a predetermined period. In the second mode, the addressable delay memory operates under the control of a remote controller and delays input data for three predetermined periods. The input data is sequentially stored in each of three sections of a dynamic random access memory means with the three delays being determined by the time required to fill each of the three sections. The delayed data from each of the three sections is coupled to a static random access memory means. The remote controller may request the data words from any of the three groups of delayed data to be placed on the output of the addressable delay memory device.

Other objects and many of the attendant advantages will be readily appreciated as the present invention becomes better understood by reference to the following detailed description when considered in conjunction with the accompanying drawings wherein:

DESCRIPTION OF THE PREFERRED EMBODINENT

Figure 1:
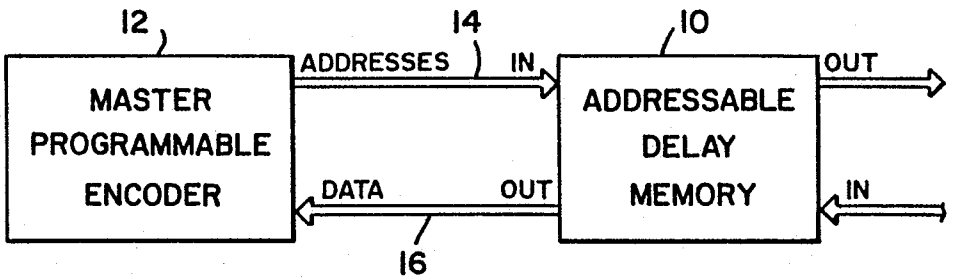
FIG. 1 illustrates the present invention in an addressable encoder system.

Referring now to the drawings, wherein like reference characters designate the same parts throughout the several Figures and, more particularly to the block diagram of FIG. 1, the preferred embodiment of the addressable delay memory 10 is coupled as a remote unit to a master programmable controller 12 (i.e., a compatible bus controller) of an addressable encoder system over an address bus 14 and a data bus 16. The preferred embodiment of the addressable delay memory according to the present invention is a dual mode device. In the first mode, referred to herein as the serial mode, the preferred embodiment of the addressable delay memory functions as a standard delay memory in which data is received, stored for a defined period of time, and then presented at an output for transmission. In the second mode, referred to herein as the addressable mode, the preferred embodiment functions as a remote unit in an addressable encoder system.

Figure 2:
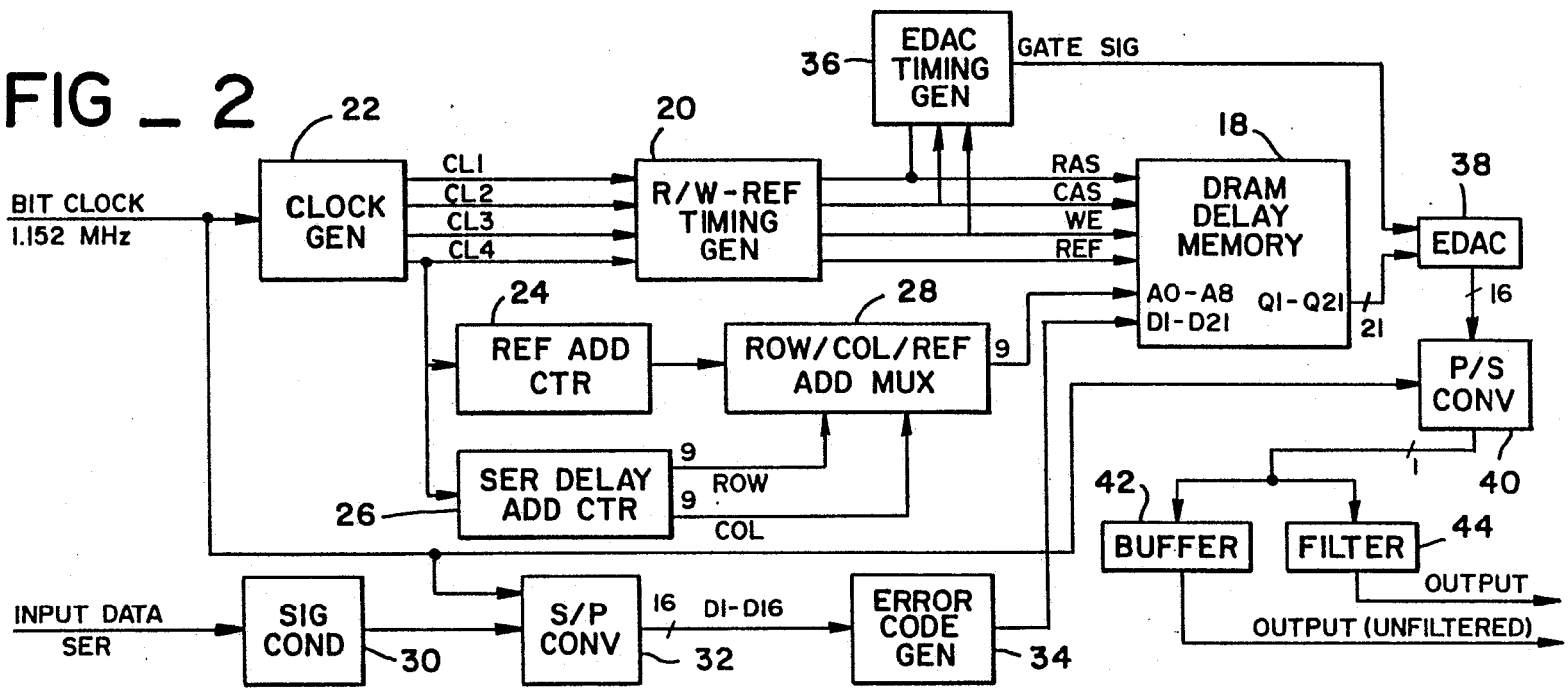
FIG. 2 is a schematic block diagram of the preferred embodiment of the addressable delay memory in the serial mode of operation.

Referring now to the block diagram of FIG. 2, in the serial mode the preferred embodiment of the addressable delay memory includes a delay memory 18 comprised of twenty-one dynamic random access memories (dynamic RAMS) of 256K each. The delay memory 18 is coupled to a read/write- refresh timing sequence generator 20 which supplies the required control and timing signals to operate the dynamic RANS - row address strobe (RAS), column address strobe (CAS), write enable (WE), and refresh (REF). The timing generator 20 is supplied with four clock signals CL1–CL4 which are generated from an external bit clock by an internal clock generator 22. In the preferred embodiment, the bit clock rate is 1.152 HHz and the four clock signals CL1–CL4 are 576 KHz, 288 KHz, 144 KHz, and 72 KHz, respectively.

The CL4 clocking signal is applied to a refresh address counter 24 and a serial delay address counter 26 which provides the row/column addresses for the input data. The outputs of the counters 24 and 26 are applied to a row/column/refresh address multiplexer 28. The output of the address multiplexer 28 is applied to the address inputs A0–A8 of the delay memory 18.

The input data, which is pulse code modulation (PCM), non-return-to-zero-level (NRZ-L) data in the preferred embodiment, is coupled through a signal conditioning circuit 30 and clocked at the bit clock rate through a serial-to-parallel converter 32 for conversion to 16-bit parallel data. The parallel data are coupled through an error code generator 34 which adds five parity bits. Twenty-one bits (16 data bits plus 5 parity bits) are then applied to data inputs D1–D21 of the delay memory 18.

The data is loaded sequentially into the delay memory 18 from address 0 through address 256K under the control of the address counter 26. The serial delay period of 3.64 seconds is required to load the entire memory at the nominal clock rate. The data is transferred to data outputs Q1–Q21 in the order that it was entered as new 16-bit data words plus 5 parity bits are applied to data inputs D1–D21.

Turning now to the output circuitry, the row address strobe, RAS, the column address strobe, CAS, and write enable, WE, are also coupled from the timing generator 20 to an error detection and correction (EDAC) timing generator 36. The EDAC timing generator 36 provides gate signals to error detection and correction circuit 38 which corrects for errors induced in the data within the delay memory 18. The sixteen bits corresponding to the original data which was input to the error code generator 34 are coupled from the EDAC circuit 38 to a parallel-to-serial converter 40 for conversion to PCN NRZ-L data at the bit clock rate. The serial data from converter 40 is coupled through an output buffer 42 to provide an unfiltered data output and through pre-modulation filter 44 for input to an external transmitter(not shown).

Figure 3:
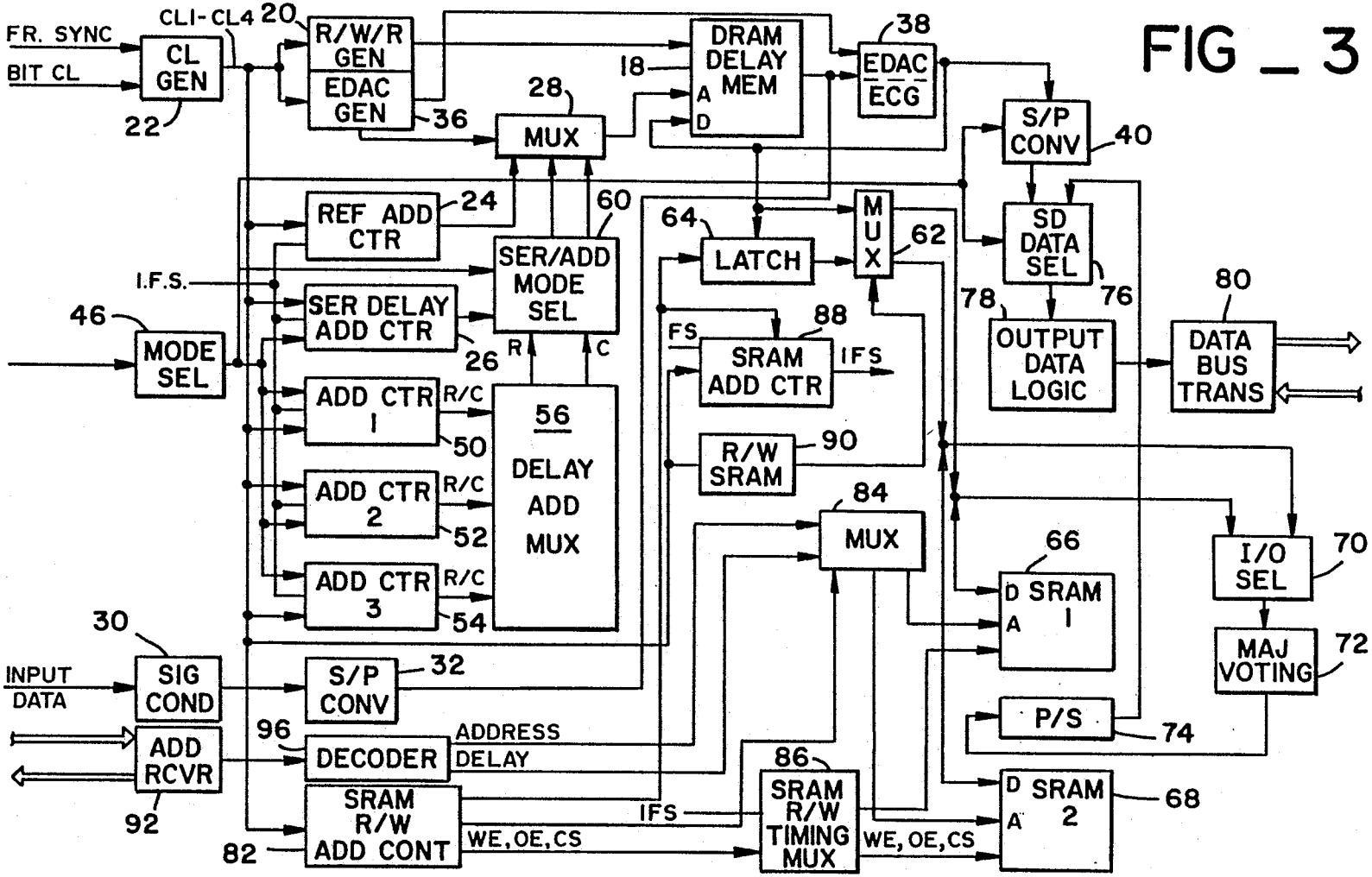
FIG. 3 is a schematic block diagram of the preferred embodiment of the addressable delay memory in the addressable mode of operation.

Turning now to the addressable mode of the addressable delay memory 10 and referring to the schematic block diagram of FIG. 3, the addressable mode of the preferred embodiment is selected by a hardwire patch to mode control circuit 46. The mode control circuit 46 sends a mode select signal to enable various circuits for operation in the addressable mode as will be described hereinafter. The mode select signal is coupled to enable three delay address memory counters 50, 52 and 54. Address counter 50 is associated with addresses 1–180K of each dynamic RAN of delay memory 18 and a delay of approximately 2.5 seconds. Address counter 52 is associated with addresses 181K-216K of each dynamic RAM of delay memory 18 and a delay of approximately 0.5 seconds. Address counter 54 is associated with addresses 217K–252K of each dynamic RAM of delay memory 18 and a delay of approximately 0.5 seconds. The address counters 50, 52, and 54 are clocked from clock generator 22 at the 16-bit word rate of CL4 (72 KHz).

The outputs from the address counters 50, 52, and 54 (and address counter 26 in the serial mode) are the row and column of the appropriate block of delay memory in which the appropriate data bit is to be stored. The row and column outputs (9 bits designating the row and 9 bits designating the column) are coupled from each address counter 50, 52 and 54 to a delay address multiplexer 56. The multiplexed outputs of the counters 50, 52 and 54 are coupled to serial/addressable mode address select circuit 60. The mode select circuit 60 is enabled by the mode control circuit 46 to select the multiplexed output of the address counters 50, 52, and 54(in the addressable mode) or the output of the serial delay address counter 26 (in the serial mode)for transmission to the row/column/refresh address multiplexer 28. The output of the multiplexer 28 is coupled to the address input lines AO–AB of the delay memory 18.

Figure 4:
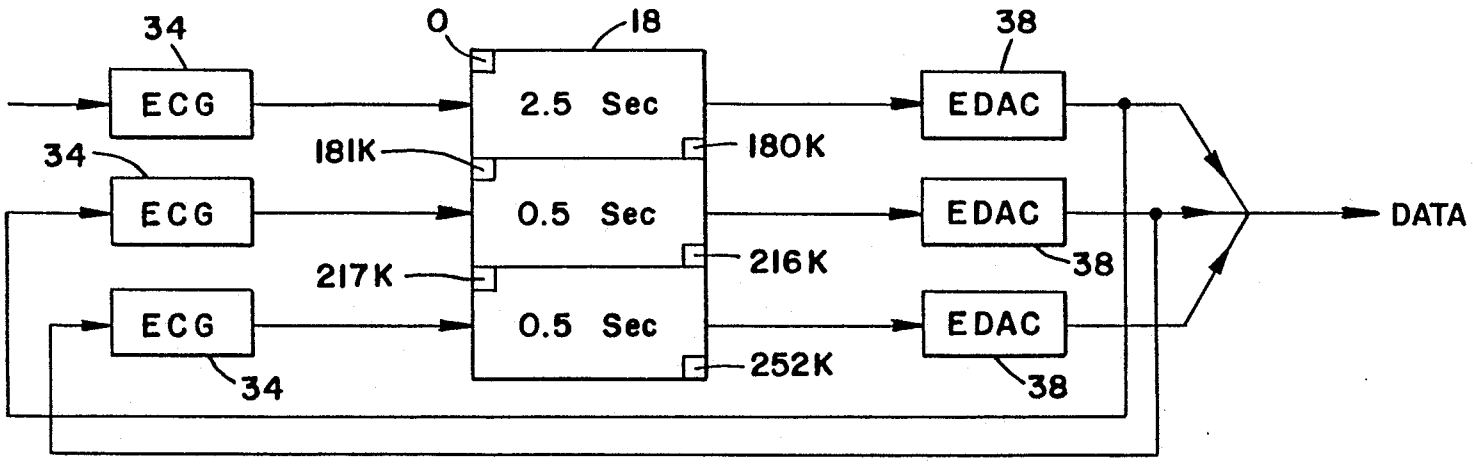
FIG. 4 is a block diagram illustrating the operation of the delay memory section of the preferred embodiment.

The input PCM NRZ-L data is coupled through the signal conditioning circuit 30 and the serial-to-parallel converter 32 as in the serial mode and then cycled though the delay memory. Referring to FIG.4 in addition to FIG. 3, the delay memory 18 is partitioned into three sections with the first section containing addresses 0–180K and corresponding to a delay of approximately 2.5 seconds, the second section containing addresses 181K through 216K and corresponding to a delay of approximately 0.5 seconds, and the third section containing addresses 217K through 252K and corresponding to a delay of approximately 0.5 seconds. The 16-bit parallel data from the serial-to-parallel converter 32 is coupled to the error code generator 34 where 5 parity bits are added and then coupled to the data input lines D1–D21 of the delay memory 18. It is noted that the representations of the error code generator 34 as three distinct blocks and the error detection and correction circuit 38 as three distinct blocks is a functional representation. Each of these functions maybe provided by a single timeshared circuit.

As controlled by the first delay memory address counter 50, the data is sequentially written into the first section of the delay memory 18 (that is, addresses 0–180K). Approximately 2.5 seconds are required to load the first section of the delay memory 18 (at the nominal clock rate of 72 KHz). When the first section of the delay memory 18 is filled, the data is placed on the output lines of the delay memory in the order that it was entered. The entering input data continues to be sequentially entered into the first section, starting at address zero, as the originally input data is placed on the output lines, starting at address zero.

The 21 bit data output lines are coupled to error detection and correction circuit 38 which provides 16 bits of error-corrected delayed (2.5 seconds) data at the output. The error-corrected delayed (2.5 seconds) data is coupled back to the error code generator 34 where five parity bits are added and then the delayed data is coupled to the data input lines D1–D21 of the delay memory 18. The delayed (2.5 seconds) data is sequentially written in the second section of the delay memory 18—that is, addresses 181K through 216K—under the control of the second delay memory address counter 52. Approximately 0.5 second is required to load the second section of the delay memory 18. As was the case with the data loaded into the first section of the delay memory 18, when the second section of the delay memory is filled, the data is placed on the output lines of the delay memory in the order that it was entered. The entering 2.5 second delayed input data continues to be sequentially entered into the second section as the 3.0 second delayed data is placed on the output lines, starting at address 181K. The 21 bit data output lines are coupled to error detection and correction circuit 38 which provides 16 bits of error-corrected delayed (3.0 seconds) data at the output.

The error-corrected twice delayed (3.0 seconds) data is coupled back to the error code generator 34 where five parity bits are added and then coupled to the data input lines D1–D21 of the delay memory 18. The delayed (3.0 seconds) data is sequentially written in the third section of the delay memory 18—that is, addresses 217K through 252K—under the control of the third delay memory address counter 54. Approximately 0.5 second is required to load the third section of the delay memory 18. As was the case with the data loaded into the first and second sections of the delay memory 18, when the third section of the delay memory is filled, the data is placed on the output lines ofthe delay memory sequentially in the order that it was entered. The entering 3.0 second delayed input data continues to be sequentually entered in the third section as the three-times delayed data is placed on the output lines. The 21 bit data output lines are coupled to the error detection and correction circuit 38 which provides 16 bits of error-corrected delayed 3.5 seconds) data at the output.

Figure 5:
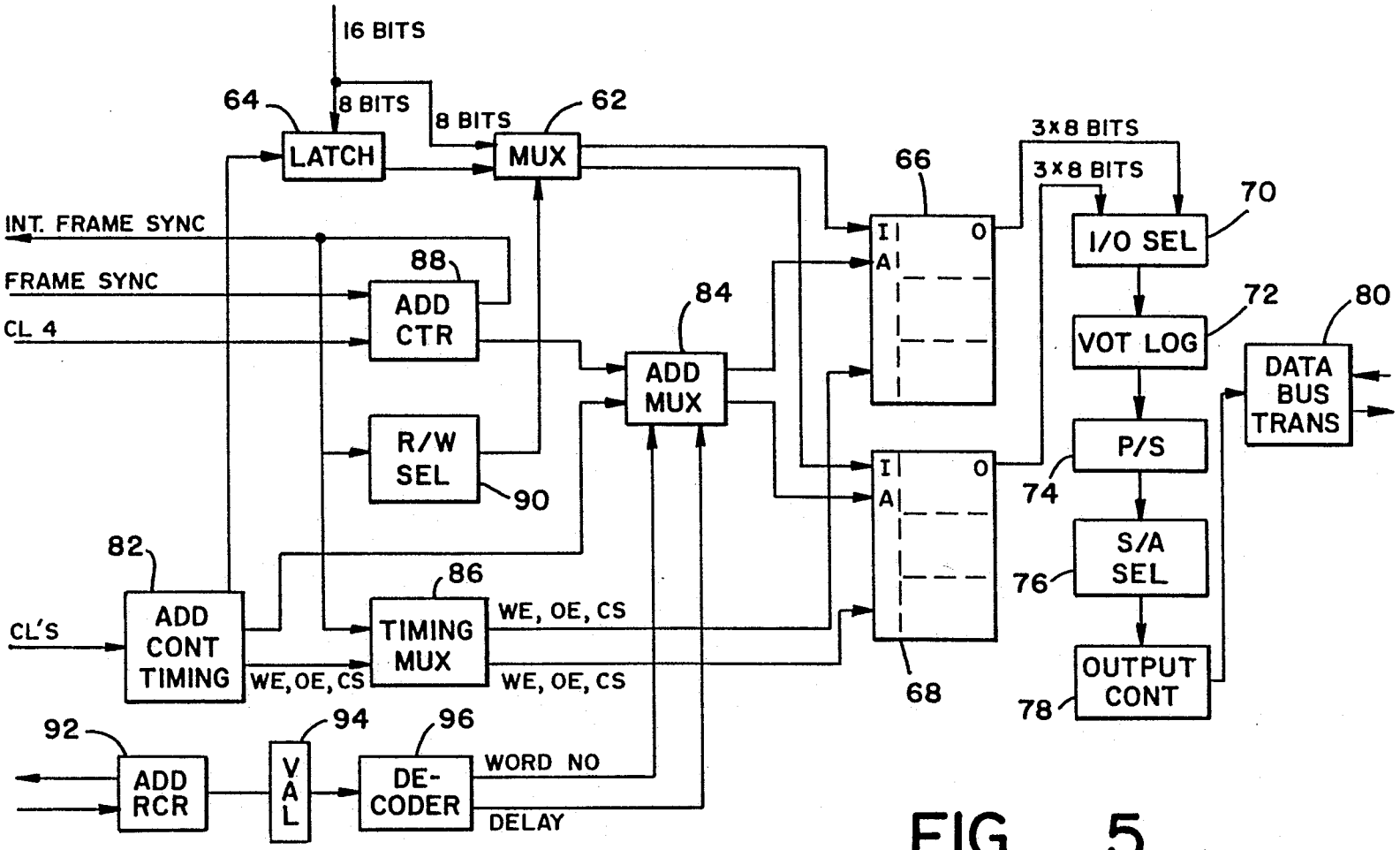
FIG. 5 is a schematic block diagram illustrating the operation the addressable selection of specific delayed data words.

The delayed 16-bit data (delayed approximately 2.5 seconds, 3.0 seconds or 3.5 seconds) are also coupled to circuitry which provides addressable selection of specific delayed data words for output on data bus 16. Referring to FIG. 5 in addition to FIG. 3,the first eight bits of the delay memory output are coupled directly to an eight-bit-word multiplexer 62 and the second eight bits are coupled to the multiplexer 62 through an eight-bit latch 64. The multiplexed 8-bit words are coupled to a static random access memory (SRAM) means which will be described more fully hereinafter. The SRAM means comprises two SRAMS 66 and 68 with each SRAM including three 2K by 8-bit CMOS SRAMS. Each 2K by 8-bit CMOS SRAM is partitioned into three sections—one section for storing the 2.5 second delayed data, a second section for storing the 3.0 second delayed data and a third section for storing the 3.5 second delayed data.

The delayed data is coupled to the SRAM means in the following manner. Considering the 3.5 second delayed data, for example, a data word (8 bits) is written in the appropriate partition of each CMOS SRAM of either SRAM 66 or SRAM 68. The SRAM's 66 and 68 are controlled so that when one is available for writing in data, the other is available for reading out data. When a specific data word is requested by the master programmable encoder 12, the requested data word is put on the output lines of each of the three 2K by 8-bit CNOS SRAMS and coupled through an I/0 select means 70 which selects the output from the SRAM that is being read and couples the three versions of the data word to majority voting logic means 72 for error correction. The logic means 72 performs a two-out-of-three comparison and couples the majority data word through a parallel-to-serial converter 74 to a serial/addressable data select circuit 76. When circuit 76 is in the addressable mode (enabled by the mode select circuit 46), the data word is coupled through output data control logic circuitry 78 to the data bus transmitter 80.

The timing and control of the SRAM means is provided by read/write, address control timing means 82. Timing means 82, which receives clock signals CL1–CL4 from the clock generator 22, provides the necessary control signals for operating the SRAMS 66 and 68. The SRAM timing means 82 provides a LSW (least significant word)toggle signal to the 8-bit latch 64, control signals to an SRAM address multiplexer 84, and control signals (write enable, output enable, and chip select) for operating the SRAMS 66 and 68. The SRAM control signals are coupled to the appropriate SRAM 66 or 68 through an SRAM read/write timing multiplexer 86. An SRAM memory address counter 88 receives the CL4 clocking signal and a frame sync signal (The data format is 8-bits per word with 360 words per frame at the bit rate of 1.152 MHz.) indicating the beginning of a frame of data words and provides an internal frame sync signal which is coupled to the address counters 50, 52 and 54, to read/write select 90, and to the SRAM timing multiplexer 86. The SRAM memory address counter 88 also provides address bits A1–A8 to an SRAM address multiplexer 84.

The address bus 14 is coupled to an address receiver 92. The output of the address receiver is coupled to an address format validation means 94 which checks the incoming address word for illegal bit patterns and for proper parity. The output of the format validation means 94 is coupled to a command decoder and timing control 96 which decodes the address word to determine which delayed data word is to be placed on the output lines of the SRAM's 66 and 68. The data word is identified by the delay time (1000, 1200, or 1400 frames before the current frame—corresponding to 2.5 seconds, 3.0 seconds, or 3.5 seconds, respectively, at the nominal clock rate) and the word number of the frame. The delay time (2 bits) and the word number (9 bits) are coupled to the SRAM address multiplexer 84 for distribution to the appropriate SRAM 66 and 68.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. An addressable delay memory device for delaying digital data for a selectable period and for use in an addressable encoder system under the control of a master controller, said addressable delay memory device comprising:

(a) dynamic random access memory means having an address control input, a data input, a data output, and read/write/refresh control inputs;

(b) timing means for controlling read/write/refresh functions of said dynamic random access memory means, (c) data address counter means for controlling the address of said dynamic random access memory means into which said input data is entered;

(d) refresh address counter means for controlling the address of the dynamic access memory means for refreshing the data in said dynamic random access memory means;

(e) row/column/refresh address multiplexer for multiplexing the outputs of said data address counter and said refresh address counter to the address inputs of said dynamic random access memory means;

(f) means for receiving digital data, said digital data being coupled from said means for receiving said digital data to the data input of said dynamic random access memory means;

(g) static random access memory means for receiving output data from said dynamic random access memory means, said static random access memory means having a data input, an address input, a data output, and write enable, output enable, and chip select control inputs;

(h) static random access memory means address counter for controlling the address of said static random access memory means into which input data is written and from which output data is read;

(i) timing means for read/write/address control of said static random access memory means;

(j) receiver means for receiving control commands from the master controller, said receiver means decoding said commands and controlling said static random access memory means to place the selected data from said static random access memory means on output lines of said static random access memory means; and (k) data bus transmitter means for transmitting data to said master controller.

2. An addressable delay memory device as recited in claim 1 further comprising:

(a) means for detecting and correcting for errors induced in said data while within said dynamic random access memory means.

3. An addressable delay memory device as recited in claim 2 wherein said receiver means comprises:

(a) a receiver for receiving the address word on the address bus from the master controller; and (b) command decoder and timing means for decoding the address word to determine a delayed data word to be placed on output lines of the static random access memory means.

4. An addressable delay memory device as recited in claim 1 wherein (a) said dynamic random access memory means is partitioned into a first section, a second section, and a third section; and wherein (b) said data address counter means includes a first counter, a second counter, and a third counter, with the first, second, and third counters associated with the first, second and third sections, respectively, of said dynamic random access memory means and controlling the data address of said dynamic random access memory means into which said input data is entered, said data being written sequentially in the first section of said dynamic random access memory means under the control of said first counter, the data from the first section being sequentially written in the second section under the control of said second counter after said first section is filled, and the data from the second section being written sequentially in the third section under the control of the third counter after said second section is filled; and (c) address counter multiplex means for multiplexing the outputs of said first counter, said second counter, and said third counter to said row/-column/refresh address multiplexer; and wherein (d) said static random access memory means is partitioned into a first section, a second section and a third section, the output data from said first, second and third sections of the dynamic random access memory means being coupled to said first, second, and third sections, respectively, of said static random access memory means.

* * * * *